United States Patent
Aho

(10) Patent No.: US 10,018,078 B2
(45) Date of Patent: Jul. 10, 2018

(54) APPARATUS FOR RECOVERING ENERGY FROM WATER

(76) Inventor: Richard E. Aho, Lauderdale Lakes, FL (US)

(*) Notice: Subject to any disclaimer, the term of this patent is extended or adjusted under 35 U.S.C. 154(b) by 1234 days.

(21) Appl. No.: 12/770,422

(22) Filed: Apr. 29, 2010

(65) Prior Publication Data
US 2010/0293949 A1    Nov. 25, 2010

Related U.S. Application Data

(60) Provisional application No. 61/180,302, filed on May 21, 2009, provisional application No. 61/250,740, filed on Oct. 12, 2009.

(51) Int. Cl.
| | | |
|---|---|---|
| *F01K 7/32* | (2006.01) |
| *F22B 3/08* | (2006.01) |
| *F01K 15/02* | (2006.01) |
| *F03G 7/10* | (2006.01) |
| *F22B 1/28* | (2006.01) |

(52) U.S. Cl.
CPC ............ *F01K 15/02* (2013.01); *F01K 7/32* (2013.01); *F03G 7/10* (2013.01); *F22B 1/288* (2013.01); *F22B 3/08* (2013.01)

(58) Field of Classification Search
CPC ........................................................ F01K 7/32
USPC .................................................. 60/645–683
See application file for complete search history.

(56) References Cited

U.S. PATENT DOCUMENTS

| | | | | |
|---|---|---|---|---|
| 1,226,500 | A * | 5/1917 | Fuehler | 392/399 |
| 4,416,113 | A * | 11/1983 | Portillo | 60/513 |
| 4,601,170 | A * | 7/1986 | Fiege | 60/513 |
| 4,603,554 | A | 8/1986 | Lagow | |
| 5,324,904 | A * | 6/1994 | Cresswell et al. | 219/635 |
| 6,967,315 | B2 * | 11/2005 | Centanni et al. | 219/628 |
| 8,166,761 | B2 * | 5/2012 | Moghtaderi et al. | 60/651 |
| 8,375,712 | B2 * | 2/2013 | Busselmann | 60/512 |
| 2004/0045292 | A1 * | 3/2004 | Ogawa et al. | 60/651 |
| 2004/0089486 | A1 | 5/2004 | Harrup et al. | |
| 2004/0261416 | A1 * | 12/2004 | White | 60/653 |
| 2005/0269316 | A1 * | 12/2005 | Monteleone et al. | 219/688 |
| 2006/0201157 | A1 * | 9/2006 | Villalobos | 60/670 |
| 2007/0251238 | A1 * | 11/2007 | Jordan | 60/645 |
| 2008/0310970 | A1 * | 12/2008 | Fenton et al. | 417/198 |
| 2010/0146975 | A1 * | 6/2010 | Fasanello, Jr. | 60/716 |
| 2011/0209474 | A1 * | 9/2011 | Leibowitz | 60/641.1 |
| 2011/0277476 | A1 * | 11/2011 | Minovitch | 60/645 |

FOREIGN PATENT DOCUMENTS

| | | | |
|---|---|---|---|
| WO | 03042502 A1 | 5/2003 |
| WO | 2007131281 A1 | 11/2007 |
| WO | WO 2007131281 A1 * | 11/2007 |

OTHER PUBLICATIONS

Pump Catalog, CAT PUMPS, © 2014.*
(Continued)

*Primary Examiner* — Laert Dounis
(74) *Attorney, Agent, or Firm* — Luedeka Neely Group, P.C.

(57) ABSTRACT

Apparatus for recovering energy from water is disclosed. Water is heated by application of electrical energy to heaters and contacting the water with the heaters in a manner and under pressure and temperature conditions such that it is instantaneously converted to gas.

4 Claims, 4 Drawing Sheets

(56) References Cited

OTHER PUBLICATIONS

Power Turbine Thermodynamics, NASA (Jun. 11, 2008).*
Kinsey, J.L. et al., "Energy and Chemical Change", Final Technical Report; Rice University, Houston, Texas; Dec. 2001.
Raz, T. et al., "On the Shattering of Clusters by Surface Impact", R. Camparague Ed. Springer, Berlin 2001, pp. 849-872.
Hong-Hui et al., "The Measurement of Impact Pressure and Solid Surface Response in Liquid-Solid Impact Up To Hypersonic Range", Tohuku University, Katahira, Japan 1995.
International Search Report International Application No. PCT/US2010/033171 dated Jul. 2, 2010.
Arc-liberated Chemical Energy Exceeds Electrical Input Energy; 2000 Cambridge University Press, Peter Graneau, Neal Graneu, George Hathaway and Richard L. Hull; (14 pages).
Physics in an Automotive Engine; Abstract from C. Johnson Physicist; First placed on the Internet Feb. 2003; (4 pages).
Raz, T., et al, "On the Shattering of Clusters by Surface Impact Heating," The Fritz Haber Research Center for Molecular Dynamics, The Hebrew University, Jerusalem 91904, Israel, pp. 8097-8102, Received Jul. 1996, Accepted Aug. 1996.

* cited by examiner

APPARATUS FOR RECOVERING ENERGY FROM WATER

CROSS-REFERENCE TO RELATED APPLICATIONS

This application claims priority under all applicable rules and statutes to U.S. Provisional Application Ser. No. 61/180,302, filed May 21, 2009, and entitled "Steam Engine With Internal Instant Steam Generator," and U.S. Provisional Application Ser. No. 61/250,740, filed Oct. 12, 2009, and entitled "Apparatus For Recovering Energy From Water," each incorporated herein by reference in its entirety.

FIELD

The present disclosure relates to power generation devices. More particularly, the disclosure relates to power generation device that supply electrical energy to heaters to heat liquid water in a manner that substantially instantaneously changes the water from a liquid state to a gaseous state.

BACKGROUND

Conventional attempts to heat water to provide power, such as steam engines, require that more energy be supplied to heat the water to steam than is realized upon conversion of the water into steam.

In accordance with the present disclosure, liquid water is substantially instantaneously converted to a gas state. It has been discovered that substantially instantaneously converting liquid water to gas in accordance with the disclosure results in a release of energy from the water. Thus, it has been discovered that water may be utilized according to the disclosure as a fuel to generate power.

SUMMARY

The above and other needs are met by an apparatus for recovering energy from water. The apparatus is configured to heat a surface and to directly contact the heated surface with water introduced in a manner and in a sufficiently small amount such that the water substantially instantaneously changes water from a liquid state to a gaseous state.

In one embodiment, the apparatus includes a system for supplying heat having one or more heat transfer elements; a source of energy for energizing the heat transfer elements for supplying heat at a desired temperature; a source of water; and a fluid injector in flow communication with the source of water for delivering water for contact with the heat transfer elements under conditions such that when the injected liquid water is contacted with the heat transfer elements it is substantially instantaneously vaporized to a gas. The motive force powers a piston or a turbine or other power generation structure for generating power from the motive force.

In another embodiment, the apparatus includes one or more cylinders, each cylinder including a piston reciprocally mounted in the cylinder and connected by a piston rod to a driven crankshaft; an electric generator connected to the crankshaft for generation of electrical power resulting from operation of the engine; a system for supplying heat having one or more heat transfer elements; a battery electrically connected to the generator and to the one or more heat transfer elements for energizing the heat transfer elements for supplying heat at a desired temperature; a source of pressurized water; an exhaust valve for evacuating the cylinder; and a fluid injector in flow communication with the source of pressurized water for delivering water for contact with the heat transfer elements so that when the injected liquid water is contacted with the heat transfer elements it is substantially instantaneously vaporized to a gas, the gas having a motive force including stored energy released from the liquid water, the motive force driving the piston so as to enable generation of power from the motive force.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
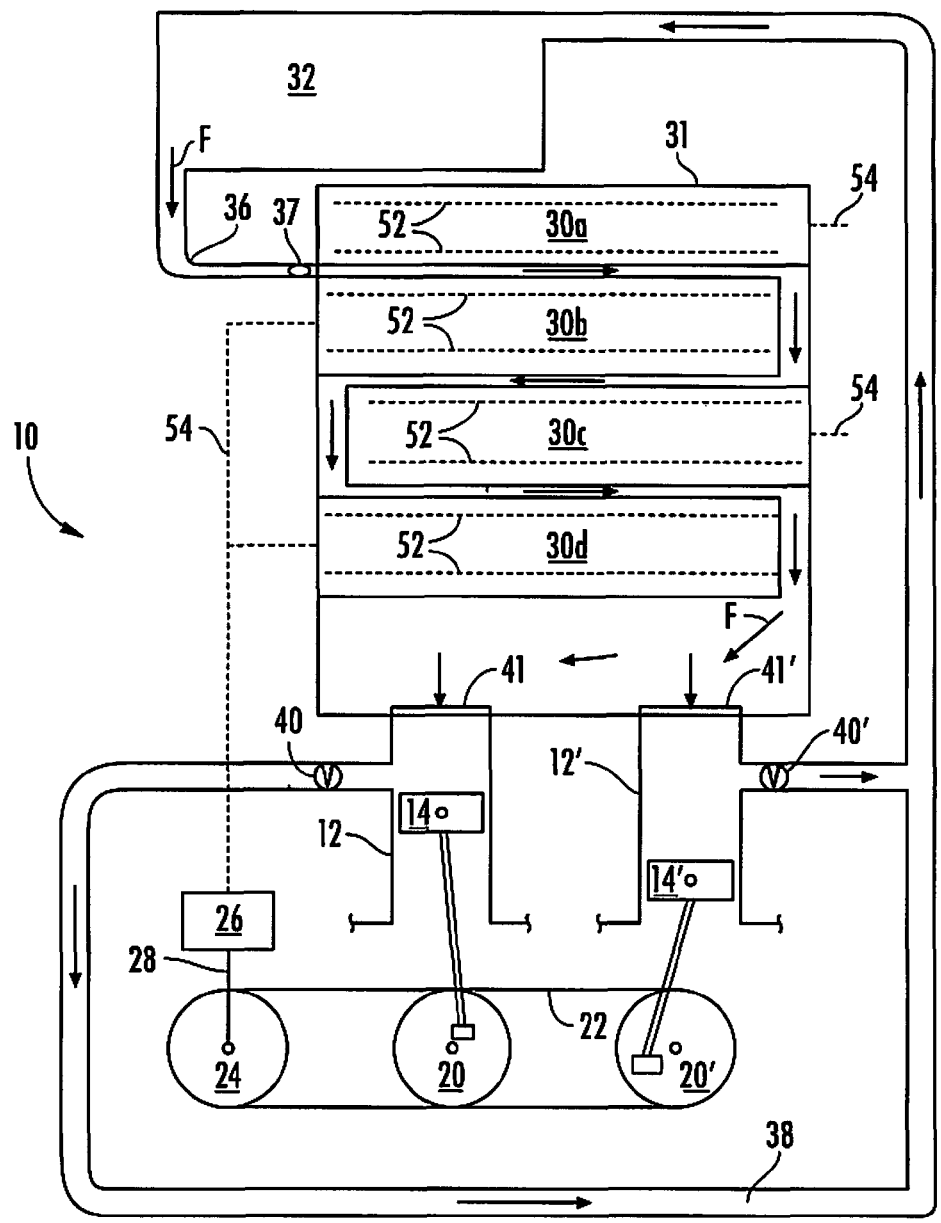
FIG. 1 is a schematic view of apparatus for recovering energy from water according to one embodiment of the disclosure.

With initial reference to FIG. 1, the disclosure relates to apparatus 10 for recovering energy from water. In brief overview, the apparatus 10 is configured to receive liquid water and to heat the water under conditions and in a manner so that liquid water is substantially instantaneously converted to a gas state.

To achieve this, heat is supplied to a surface at a temperature above the critical temperature of water and the pressure at which the water is introduced is maintained sufficiently high so that the stagnation pressure of water contacting the heated surface is above the critical pressure of water. These conditions substantially instantaneously convert water to gas.

As described more fully below, heating of the water and conversion of the water to gas is accomplished by providing and arranging heating elements according to the disclosure and supplying liquid water according to the disclosure so that water is substantially instantaneously converted to gas. To accomplish this, the volume of water introduced is very small in relation to the heated surface area.

Without being bound by theory, it is believed that the apparatus of the disclosure relies substantially exclusively on conduction heating, and substantially eliminates convective heating and avoids radiation heat transfer, as is common to conventional steam generators which depend on radiation. Methods and apparatus according to the disclosure change the state of liquid water to a high pressure gas in microseconds, which has been observed to result in release of stored energy from the water.

The apparatus 10 includes structure for converting the gas obtained from the water into work. In this regard, FIG. 1 shows for the purpose of example, a pair of cylinders located to receive the generated gas to convert the gas to mechanical work. However, it will be understood that other structure may be utilized to harness the gas pressure. For example, one or more turbines may replace the cylinders shown in FIG. 1.

With reference to FIG. 1, the apparatus 10 includes at least one cylinder 12 having a piston 14 reciprocally mounted in the cylinder 12 and connected by a piston rod 16 to a driven crankshaft 18 attached to a load, such as a flywheel 20. Additional cylinders may be provided, such as an additional cylinder 12' having piston 14'. For example, the apparatus 10 may include four cylinders, that is cylinder 12, cylinder 12' and two additional cylinders corresponding to the cylinders 12 and 12'.

A belt 22 connects between the flywheel 20 (and flywheels associated with any additional cylinders) and an electric generator 24 for transferring rotation of the flywheel 20 to the generator 24 for generation of electrical power resulting from operation of the apparatus 10. The generator 24 is electrically connected to a battery or electrical power source/controller 26, as by wiring 28. The battery 26 is electrically connected to a plurality of heat transfer plates, such as heat transfer plates 30a-30d, which convert electrical energy supplied by the battery 26 into thermal energy for heating water as explained more fully below according to the disclosure. The plates 30a-30d are within an insulated enclosure 31.

Water from a source 32, such as a radiator having a pressure pump, is continuously injected (as represented by arrows F) for travel over the heat transfer plates 30a-30d. The pressure at which the water is injected is selected so that at each point in the flowpath that the injected water must come to a stop by virtue of changing direction, the stagnation pressure of the water is above the critical pressure of water.

The source 32 is connected to the enclosure 31 by a conduit 36 having an on/off type control valve 37. To recover water from the cylinder 12, an exhaust conduit 38 exits the cylinder 12 and connects to the source 32, with the gas supplied by the conduit 38 ultimately cooling and returning to the liquid state as water. Flow from the cylinder 12 to the conduit 38 is controlled as by an exhaust valve 40. The valve 40 is preferably opened when the piston 14 is at the bottom dead center position, when it is closest to the crankshaft. The valve 40 is then closed as the piston re-approaches the top dead center position. Similarly, flow from the cylinder 12' is controlled by an exhaust valve 40'.

Gas is preferably injected into the cylinder 12 when the piston 14 is at or substantially at the top dead center position. Top dead center is the position of the piston 14 in which it is farthest from the crankshaft 18. The flow of gas into the cylinder 12 is controlled by an input valve 41 (and 41' for cylinder 12').

The exhaust valve 40 and the input valve 41 (and 41') may be controlled by a variety of valve control systems, such as by a cam driven by a camshaft connected to the crankshaft, and pneumatic or electronic controllers having associated crankshaft angle sensors. For example, the valves 40 and 41 may be controlled by a controller receiving commands from a computer, which also receives signals from a crankshaft angle sensor. Likewise, a computer is preferably utilized to control the temperature of the heat transfer plates 30a-30d and the supply of electrical power thereto. In this regard, it will be understood that various other sensors may be utilized to provide engine operating information to one or more computers associated with the operation of the engine, such as sensors capable of determining rotational speed, load, temperature, and the like.

During operation of the apparatus 10, water is substantially instantaneously converted to gas having a pressure of at least the critical pressure of water and preferably slightly greater so that the water is converted directly from liquid into gas. The critical pressure of a substance is the pressure required to liquefy a gas of the substance at its critical temperature. The critical temperature of a substance is the temperature at and above which vapor of the substance cannot be liquefied, no matter how much pressure is applied. The critical pressure of water is 3209.5 psi/218.4 atm. The critical temperature of water is 705.47° F./374.15° C.

In accordance with the disclosure, and so as to be able to supply the water at a greater pressure to enable the water to be injected into the apparatus, the water is injected at a pressure of at least about 5,000 psi. To help retain heat, the cylinder 12 and the enclosure 31 are insulated as by ceramic barriers or other insulative structure.

The heat transfer plates 30a-30d are constructed of a material having a high rate of heat transfer, such as copper, and configured relative to the input flow of water so that sufficient surface area of the plates 30a-30d and sufficient temperature is provided to rapidly heat the water and substantially instantaneously convert the water to gas. To accomplish this, the temperature of the plates is maintained above the critical temperature of water, such as above about 900° F./482° C. In addition, an excess of surface area of the plates 30a-30d is provided and the plates 30a-30d are closely spaced apart in an opposed and parallel relationship so that the water is spread into a thin flow path and the flow of water contacts both plates as it travels through the spaced apart plates.

Figure 2:
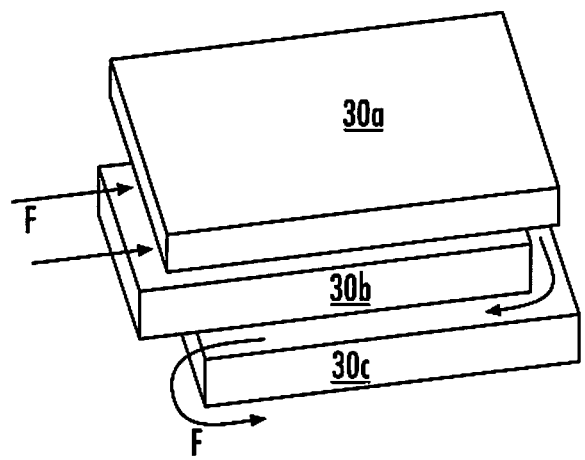
FIG. 2 is a perspective view of a heat transfer system utilized in the apparatus of FIG. 1.

With reference to FIG. 2, there is shown a perspective view of the plates 30a-30c to illustrate a desired configuration and orientation of the plates 30a-30d. As will be seen, the plates are closely spaced to one another and the lengths arranged in a staggered orientation to provide a continuous flowpath as indicated by the arrows. For example, when the apparatus 10 includes four of the cylinders (cylinders 12, 12' and two additional cylinders), the plates 30a-30d are configured to receive a flow of liquid water of 1.92 ml/min.

The desired heat transfer conditions may be accomplished by spacing the plates apart a distance of from about 0.010 inches to about 0.025 inches, with each plate having a length of about 12 inches and a width of about 5 inches. The plates 30a-30d are staggered at their ends by a distance of about 0.05 inches so as maintain a substantially uniformly sized flowpath. The orientation and configuration of the plates 30a-30d advantageously enables the water to be heated from the inside out, which results in extremely rapid heating of the water (measured in microseconds) and achieves the desired substantially instantaneous conversion to gas. That is, the copper plates 30a-30d are sufficiently hot and closely spaced so as to spread the water into a thin layer that rapidly cools the copper plates, and hence rapidly transfers heat to the water.

Figure 3:
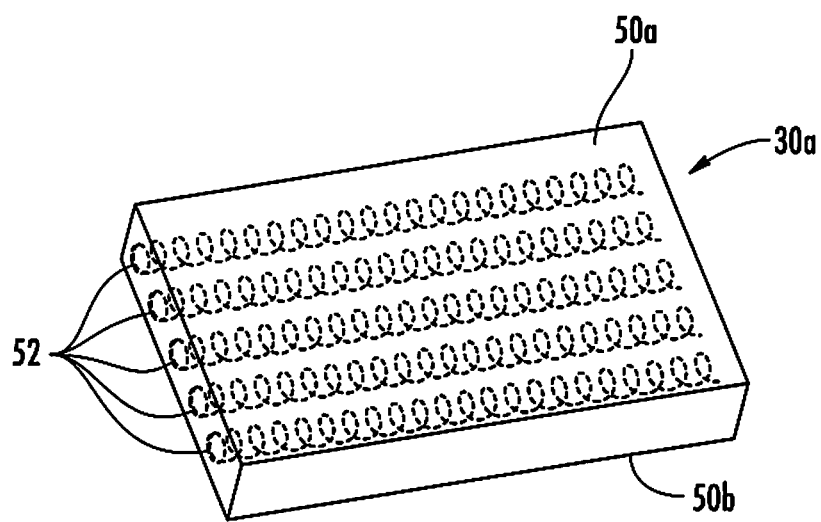
FIG. 3 is a detailed view of a section of the heat transfer system of FIG. 2.

With reference to FIG. 3, a detailed view of the plate 30a is shown, which plate is representative of the remaining plates 30b-30d. As will be seen, the plate 30a has a pair of opposed and spaced apart surfaces 50a and 50b, with the space between the surfaces 50a and 50b having a plurality of electrical heating elements 52. The heating elements 52 are electrically connected to the battery 26, as by wiring 54 shown in FIG. 1, to convert electrical energy supplied by the battery 26 into thermal energy to maintain the surfaces 50a and 50b at a desired temperature above the critical temperature of water, and preferably at least about 900° F. For thermally acting upon the afore-described 1.92 ml/min. flow of water, the heating elements of the plates 30*a*-30*d* collectively have an output of at least about 80 killowatts.

Together, the excess surface area of the plates 30*a*-30*d*, the close spacing of adjacent plates, and the excess heat supplied by maintaining the plates at a temperature above the critical temperature of water, is believed to provide a structure and conditions so that as water is converted to gas as it travels over the plates 30*a*-30*d*, such conversion occurs substantially instantaneously.

Figure 4:
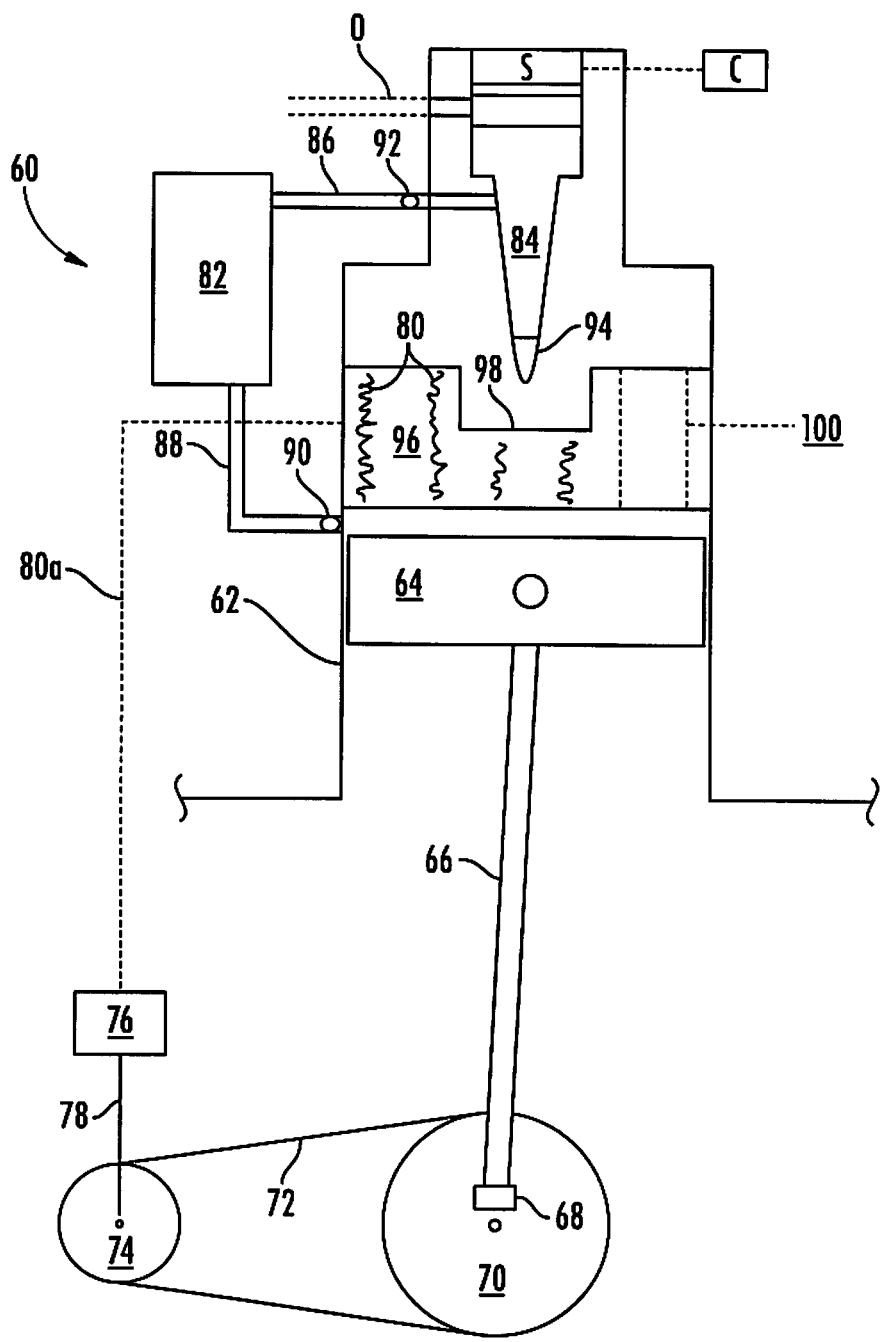
FIG. 4 is a schematic view of apparatus for recovering energy from water according to another embodiment of the disclosure.
Figure 5:
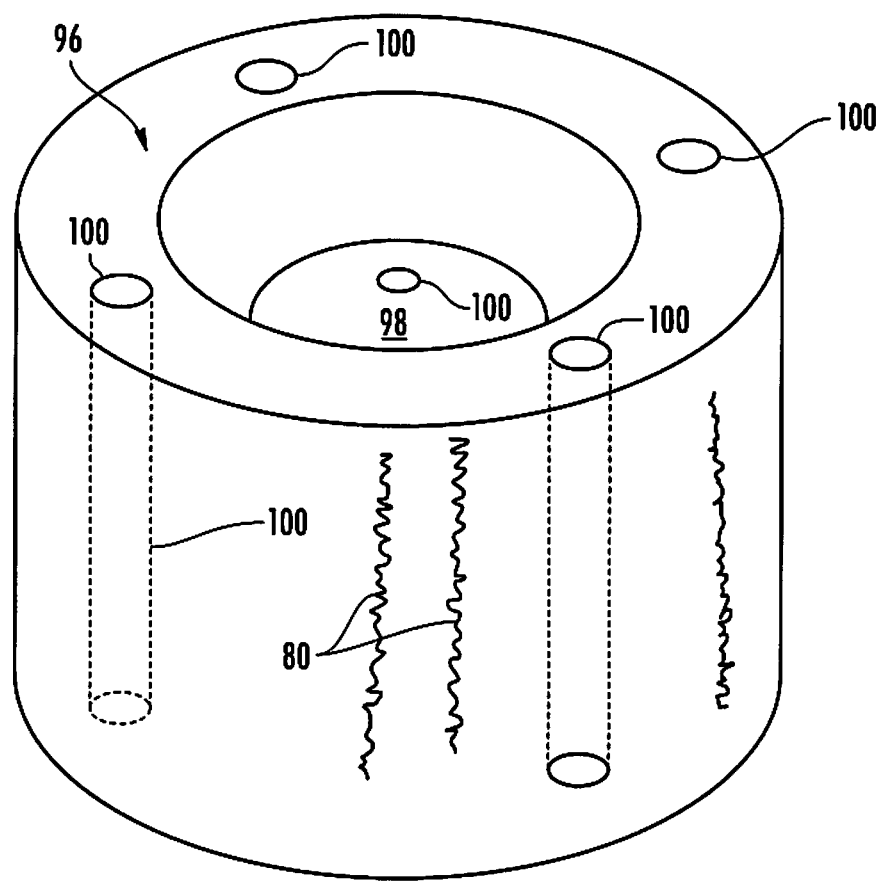
FIG. 5 is a perspective view of an impact chamber for use in the apparatus of FIG. 4.

With reference now to FIG. 4, there is shown an alternate embodiment of apparatus 60 for recovering energy from water. The apparatus 60 is configured to have similar operating conditions to the apparatus 10, that is, a contact surface is heated to a temperature above the critical temperature of water and contacted with pressurized water so that the stagnation pressure of water contacting the contact surface is above the critical pressure of water to achieve substantially instantaneous conversion of water to gas.

The apparatus 60 includes a cylinder 62 having a piston 64 reciprocally mounted in the cylinder 62 and connected by a piston rod 66 to a driven crankshaft 68 attached to a load, such as a flywheel 70. A belt 72 connects between the flywheel 70 and an electric generator 74 for transferring rotation of the flywheel 70 to the generator 74 for generation of electrical power resulting from operation of the apparatus 60. The generator 74 is electrically connected to a battery or electrical power source/controller 76, as by wiring 78. The battery 76 is electrically connected to a plurality of heating elements 80 as by wires 80*a*. The heating elements 80 convert electrical energy supplied by the battery 76 into thermal energy for heating water and substantially instantaneously converting water to gas.

Water from a source 82, such as a radiator having a pressure pump, is intermittently injected into the cylinder 62 by an electronically controlled high pressure water injector 84. For example, as shown, the water injector 84 may be a fuel injector of the type having a 110 volt solenoid S controlled by a computer C, with the injector 84 also being supplied with high pressure engine oil via oil line O. The injector 84, however, injects water from the source 82 instead of gasoline from a gasoline tank. The injector 84 is preferably operable to supply the water at a pressure of about 15,000 pounds per square inch.

The water source 82 is connected to the injector 84 by a conduit 86. To recover water from the cylinder 62, an exhaust conduit 88 exits the cylinder 62 and connects to the source 82, with the water gas supplied by the conduit 88 ultimately cooling and returning to the liquid state as water. Flow from the cylinder 62 to the conduit 88 is controlled as by an exhaust valve 90. The valve 90 is preferably opened when the piston 64 is at the bottom dead center position. The valve 90 is then closed as the piston re-approaches the top dead center position.

Water gas is preferably injected from the injector 84 into the cylinder 62 when the piston 64 is at or substantially at the top dead center position. The flow of water from the source 82 is controlled by an input valve 92 for passage through an atomizer 94 of the injector 84. The atomized water is passed onto an impact chamber 96 made of copper or other high heat transfer material and having a contact surface 98 facing the atomizer 94 to receive the discharge from the atomizer 94. Heat is supplied to the impact chamber by the heating elements 80 which are uniformly distributed throughout the material of the impact chamber to effect substantially uniform heating thereof. As the liquid water strikes the contact surface 98, it is forced to stop moving and exerts a stagnation pressure. In accordance with the disclosure, the pressure at which the water is injected is sufficient such that the stagnation pressure of water contacting the heated contact surface 98 is above the critical pressure of water.

In addition, the surface area of the impact chamber 96 is sufficiently large relative to the incoming liquid water from the atomizer 94 such that upon contact of the water with the contact surface 98, the water disperses and a relatively small surface area of water contacts the substantially greater surface area represented by the hot surfaces of the chamber 96 so as to substantially instantaneously convert to gas. The gas further expands and travels through passages 100 of the chamber 96 for affecting the piston 64.

As in the case of the heat transfer plates 30*a*-30*d*, the high surface temperature of the chamber 96, and the large difference between the surface area of the chamber 96 that is contacted by liquid water and the small volume of water as supplied by the injector 84, results in a rapid transfer of heat to each injected volume of water to provide a heat flux or transfer rate that is sufficiently high such that the water is substantially instantaneously converted to gas. The injector 84 preferably supplies water at a pressure of at least about 15,000 psi and the water contact surfaces of the chamber 96 at a temperature of at least about 900° F.

The apparatus of the disclosure may be used as an engine or power generating apparatus, and multiple ones of the cylinders may be used in concert to provide such engine or power generating apparatus. The apparatus may be installed on a vehicle to power the vehicle, utilized to generate electricity, and in other ways in the manner of power generators. For example, the source of water 32 is shown as a radiator with a pump, which may correspond to a radiator having a pump of a type utilized in vehicles and mounted on the vehicle.

Furthermore, while conversion of water to gas is described, it will be understood that the apparatus described may alternatively be utilized to convert other liquids to gas in the manner described, to the extent such controlled gasification of the liquid releases stored energy from the liquid.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed:

1. Apparatus for producing super critical steam from water, comprising:
   a source of liquid water consisting essentially of (1) a cooling radiator, (2) a high pressure pump; and (3) a high pressure fluid injector in flow communication with the radiator and the pump for receiving the liquid water in the absence of super heating, the injector including an atomizer for delivering atomized liquid water at a pressure above the critical pressure of water for contact with a contact surface of an impact chamber within the apparatus at a location subsequent to the injector, the impact chamber comprising a sidewall surrounding and rising upwardly from the contact surface and having plurality of gas flow passages therethrough and electrical heating elements therein; and a source of energy for energizing the electrical heating elements for supplying heat at a desired temperature above the critical temperature of water, wherein when the injected atomized liquid water contacts the contact surface of the impact chamber within the apparatus the atomized liquid water is substantially instantaneously vaporized to supercritical steam and the supercritical steam travels though the gas flow passages of the impact chamber, with the supercritical steam thereafter being routed via a conduit to the radiator to be cooled to provide the liquid water that is supplied to the injector.

2. The apparatus of claim 1, wherein the source of energy is electrical energy.

3. The apparatus of claim 1, wherein the apparatus is installed on a vehicle to power the vehicle.

4. Apparatus for producing super critical steam from water, comprising:

one or more cylinders, each cylinder including a piston reciprocally mounted in the cylinder and connected by a piston rod to a driven crankshaft;

an electric generator connected to the crankshaft for generation of electrical power resulting from operation of the apparatus;

an exhaust valve for evacuating the cylinder;

a source of pressurized liquid water consisting essentially of (1) a cooling radiator, (2) a high pressure pump; and (3) a high pressure fluid injector in flow communication with the radiator and the pump for receiving liquid water in the absence of super heating, the injector including an atomizer for delivering atomized liquid water at a pressure above the critical pressure of water for contact with a contact surface of an impact chamber within the apparatus at a location subsequent to the injector, the impact chamber comprising a sidewall surrounding and rising upwardly from the contact surface and having a plurality of gas flow passages and electrical heating elements therein for heating the impact chamber; and a battery electrically connected to the generator and to the electrical heating elements for energizing the electrical heating elements for supplying heat at a desired temperature above the critical temperature of water, wherein when the injected atomized liquid water contacts the contact surface of the impact chamber the atomized liquid water is substantially instantaneously vaporized to supercritical steam and the supercritical steam travels through the gas flow passages, with the supercritical steam thereafter being routed via a conduit to the radiator to be cooled to provide the liquid water that is supplied to the injector.

* * * * *